(12) United States Patent
Ibrahim et al.

(10) Patent No.: US 7,330,892 B2
(45) Date of Patent: Feb. 12, 2008

(54) HIGH-SPEED DATA TRANSFER IN A STORAGE VIRTUALIZATION CONTROLLER

(75) Inventors: Rahim Ibrahim, Mountain View, CA (US); Glenn Yu, San Jose, CA (US); Nghiep Tran, San Jose, CA (US); Tuan Nguyen, San Jose, CA (US); Chan Ng, San Jose, CA (US); Kumar Gajjar, San Jose, CA (US); Richard Meyer, San Francisco, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 0 days.

(21) Appl. No.: 10/238,713

(22) Filed: Sep. 9, 2002

(65) Prior Publication Data
US 2003/0149848 A1 Aug. 7, 2003

Related U.S. Application Data

(60) Provisional application No. 60/317,817, filed on Sep. 7, 2001.

(51) Int. Cl.
*G06F 15/173* (2006.01)
*G06F 12/00* (2006.01)

(52) U.S. Cl. .................................................. 709/225
(58) Field of Classification Search ................ 709/217, 709/218, 225, 248, 249, 238; 711/11, 112, 711/114, 100, 203; 714/42, 43; 710/20, 710/36, 100
See application file for complete search history.

(56) References Cited

U.S. PATENT DOCUMENTS

| 4,641,302 | A | * | 2/1987 | Miller | 370/422 |
| 5,799,049 | A | * | 8/1998 | McFarland et al. | 375/362 |
| 6,032,184 | A | * | 2/2000 | Cogger et al. | 709/223 |
| 6,052,738 | A | * | 4/2000 | Muller et al. | 709/250 |
| 6,118,776 | A | * | 9/2000 | Berman | 370/351 |
| 6,148,414 | A | * | 11/2000 | Brown et al. | 714/9 |
| 6,158,014 | A | * | 12/2000 | Henson | 713/501 |
| 6,260,120 | B1 | * | 7/2001 | Blumenau et al. | 711/152 |
| 6,343,324 | B1 | * | 1/2002 | Hubis et al. | 709/229 |
| 6,438,661 | B1 | * | 8/2002 | Beardsley et al. | 711/144 |
| 6,457,098 | B1 | * | 9/2002 | DeKoning et al. | 711/114 |
| 2003/0031197 | A1 | * | 2/2003 | Schmidt | 370/462 |
| 2005/0047334 | A1 | * | 3/2005 | Paul et al. | 370/229 |
| 2006/0288134 | A1 | * | 12/2006 | Baker et al. | 710/52 |

OTHER PUBLICATIONS

Storage Networking and the Data Cente of the Future, Dale, D., Nov. 2000, pp. 1-5.*
RFC 2625: IP and ARP over Fibre Channel, Rajagopal, M. et al., Jun. 1999□□.*

* cited by examiner

*Primary Examiner*—Zarni Maung
(74) *Attorney, Agent, or Firm*—Leland Wiesner; Wiesner & Associates (57) ABSTRACT

A storage virtualization controller for transferring data between a host and a storage device at a wire-speed data transfer rate. A downstream processing element adapted for connection to the storage device is configurable coupled to an upstream processing element adapted for connection to the host. A central processing element coupled to the upstream processing element grants permission to the upstream processing element to transfer the data at the wire-speed rate without further involvement by the central processing element.

44 Claims, 10 Drawing Sheets

HIGH-SPEED DATA TRANSFER IN A STORAGE VIRTUALIZATION CONTROLLER

CROSS-REFERENCE TO RELATED APPLICATIONS

This application claims priority to U.S. Provisional Application No. 60/317,817, filed Sep. 7, 2001 and titled "Method & Apparatus for Processing fiber Channel Frames at Wire Speed", which is incorporated herein by reference. This application also relates to the subject matter disclosed in the U.S. application Ser. No. 10/238,804, by Ghate et al., filed concurrently herewith, titled "Compensating for Unavailability in a Storage Virtualization System", which is hereby incorporated by reference in its entirety.

BACKGROUND OF THE INVENTION

Storage area networks, also known as SANs, facilitate sharing of storage devices with one or more different host server computer systems and applications. Fibre channel switches (FCSs) can connect host servers with storage devices creating a high speed switching fabric. Requests to access data pass over this switching fabric and onto the correct storage devices through logic built into the FCS devices. Host servers connected to the switching fabric can quickly and efficiently share blocks of data stored on the various storage devices connected to the switching fabric.

Storage devices can share their storage resources over the switching fabric using several different techniques. For example, storage resources can be shared using storage controllers that perform storage virtualization. This technique can make one or more physical storage devices, such as disks, which comprise a number of logical units (sometimes referred to as "physical LUNs") appear as a single virtual logical unit or multiple virtual logical units, also known as VLUNs. By hiding the details of the numerous physical storage devices, a storage virtualization controller advantageously simplifies storage management between a host and the storage devices. In particular, the technique enables centralized management and maintenance of the storage devices without involvement from the host server.

Performing storage virtualization is a sophisticated process. By way of comparison, a fibre channel switch does relatively little processing on the various command and data frames which pass through it on the network. But a storage virtualization controller must perform a much greater amount of processing than a fabric channel switch in order to convert the requested virtual storage operation to a physical storage operation on the proper storage device or devices.

In many instances it is advantageous to place the storage virtualization controller in the middle of the fabric, with the host servers and controllers arranged at the outer edges of the fabric. Such an arrangement is generally referred to as a symmetric, in-band, or in-the-data-path configuration. However, this configuration is generally problematic if the controller cannot operate at the specified data rate of the fabric. In the case of fibre channel, for example, this data rate is at least 1 gigabit per second. If the controller is not capable of operating at the specified data rate, traffic on the network will be slowed down and the overall throughput and latency deleteriously reduced.

For these and other reasons, there is a need for the present invention.

BRIEF DESCRIPTION OF THE DRAWINGS

The features of the present invention and the manner of attaining them, and the invention itself, will be best understood by reference to the following detailed description of embodiments of the invention, taken in conjunction with the accompanying drawings, wherein.

SUMMARY OF THE INVENTION

In one embodiment, the present invention provides a storage virtualization controller for transferring data between a host and a storage device at a wire-speed data transfer rate. The controller includes a downstream processing element adapted to connect to a storage device, and an upstream processing element adapted to connect to a host. The upstream processing element is further adapted to configurably couple to the downstream processing element. The controller also includes a central processing element coupled to the upstream processing element. The central processing element grants permission to the upstream processing element to transfer the data through the downstream processing element without further involvement by the central processing element.

The present invention may also be implemented as a method of accessing a virtual logical unit in a storage area network. In the method, an upstream processing element receives a request from a host to access the virtual logical unit. A storage device associated with the virtual logical unit, and a downstream processing element associated with the storage device, are identified. Permission for the downstream processing element to perform the access request is obtained from a central processing element by the upstream processing element. After permission is granted, data is transferred between the upstream processing element and the downstream processing element at substantially a rated speed of the storage area network.

DESCRIPTION OF THE PREFERRED EMBODIMENT

Referring now to the drawings, there is illustrated an embodiment of a storage virtualization controller constructed in accordance with the present invention which can transfer data between a host, such as a server, and a storage device at a wire-speed data transfer rate. The host can be connected to an upstream processing element (UPE), and the storage device to a downstream processing element (DPE), of the controller. In operation, a central processing element (CPE) of the controller grants permission to the UPE to transfer the data between the host and the storage device through the UPE and the DPE without any further involvement by the CPE. One such controller is a virtual storage exchange (VSX) device designed by Confluence Networks, Incorporated of Milpitas, Calif. (VSX is a trademark of Confluence Networks, Incorporated).

Figure 1:
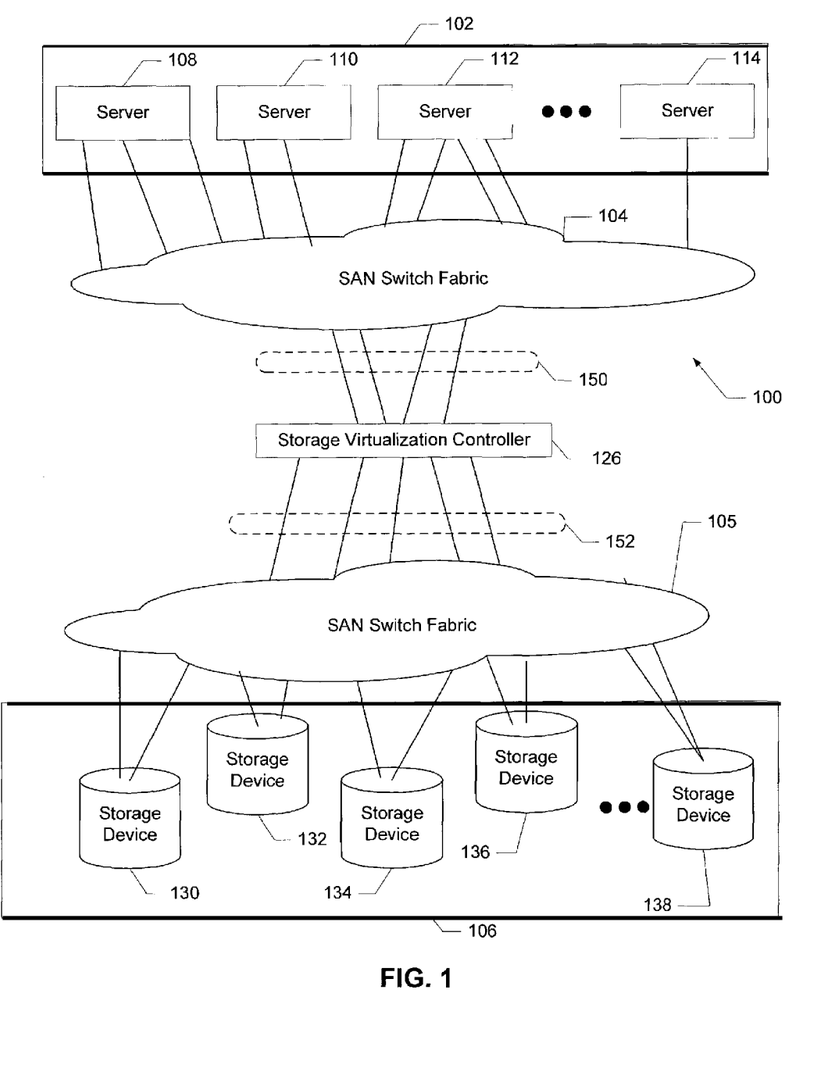
FIG. 1 is an exemplary system block diagram of the logical relationship between host servers, storage devices, and a storage area network (SAN) implemented using a switching fabric along with an embodiment of the present invention.

As best understood with reference to the exemplary configuration of FIG. 1, a storage area network (SAN) 100 may include one or more SAN switch fabrics, such as fabrics 104,105. Fabric 104 is connected to hosts 102, while fabric 105 is connected to storage devices 106. At least one storage virtualization controller 126 is inserted in the midst of SAN 100, and connected to both fabrics 104,105 to form a symmetric, in-band storage virtualization configuration. In an in-band configuration, communications between server devices 102 and storage devices 106 pass through controller 126 for performing data transfer in accordance with the present invention.

Host servers 102 are generally communicatively coupled (through fabric 104) via links 150 to individual UPEs of controller 126. In an alternate configuration, one or more host servers may be directly coupled to controller 126, instead of through fabric 104. Controller 126 includes at least one UPE for each server 102 (such as host servers 108,110,112,114) connected to the controller 126. As will be discussed subsequently in greater detail, storage virtualization controller 126 appears as a virtual logical unit (VLUN) to each host server.

Storage devices 106 are communicatively coupled (through fabric 105) via links 152 to individual DPEs of controller 126. In an alternate configuration, one or more storage devices may be directly coupled to controller 126, instead of through fabric 105. Controller 126 includes at least one DPE for each storage device 106 (such as storage devices 130,132,134,136,138) connected to the controller 126. Controller 126 appears as an initiator to each storage device 106.

Figure 2:
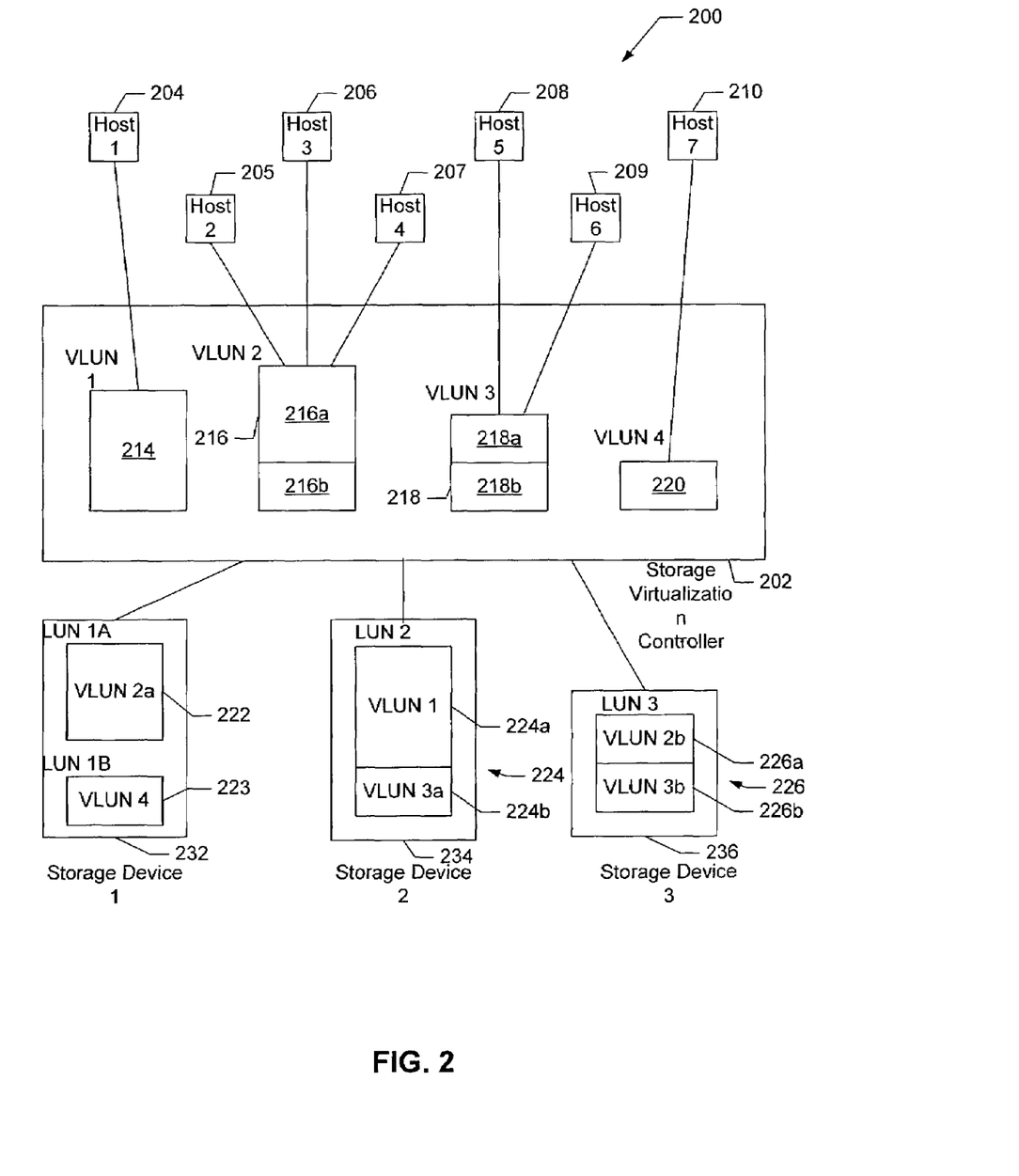
FIG. 2 is an exemplary system block diagram illustrative of the relationship provided by a storage virtualization controller between virtual logical units and logical units on physical storage devices, in accordance with an embodiment of the present invention.

Considering now the virtualization of storage provided by an embodiment of the present invention, and with reference to the exemplary SAN 200 of FIG. 2, a storage virtualization controller 202 has been configured to provide four virtual logical units 214,216,218,220 associated with hosts 204-210. In the general case, a VLUN includes N "slices" of data from M physical storage devices, where a data "slice" is a range of data blocks. In operation, a host requests to read or write a block of data from or to a VLUN. In this exemplary configuration, host1 204 is associated with VLUN1 214; host2 205, host3 206, and host4 207 are associated with VLUN2 216; host5 208 and host6 209 are associated with VLUN3 218, and host7 210 is associated with VLUN4 220. A host 204-210 accesses its associated VLUN by sending commands to the storage virtualization controller 202 to read and write virtual data blocks in the VLUN. Controller 202 maps the virtual data blocks to physical data blocks on individual ones of the storage devices 232,234,236, according to a preconfigured mapping arrangement. Controller 202 then communicates the commands and transfers the data blocks to and from the appropriate ones of the storage devices 232,234,236. Each storage device 232,234,236 can include one or more physical LUNs; for example, storage device 1 232 has two physical LUNs, LUN 1A 222 and LUN 1B 223.

To illustrate further the mapping of virtual data blocks to physical data blocks, all the virtual data blocks of VLUN1 214 are mapped to a portion 224a of the physical data blocks LUN2 224 of storage device 234. Since VLUN2 216 requires more physical data blocks than any individual storage device 232,234,236 has available, one portion 216a of VLUN2 216 is mapped to the physical data blocks of LUN1A 222 of storage device 232, and the remaining portion 216b of VLUN2 216 is mapped to a portion 226a of the physical data blocks of LUN3 226 of storage device 236. One portion 218a of VLUN3 218 is mapped to a portion 224b of LUN2 224 of storage device 234, and the other portion 218b of VLUN3 218 is mapped to a portion 226b of LUN3 226 of storage device 236. It can be seen with regard to VLUN3 that such a mapping arrangement allows data block fragments of various storage devices to be grouped together into a VLUN, thus advantageously maximizing utilization of the physical data blocks of the storage devices. All the data blocks of VLUN4 220 are mapped to LUN1B 223 of storage device 232.

While the above-described exemplary mapping illustrates the concatenation of data block segments on multiple storage devices into a single VLUN, it should be noted that other mapping schemes, including but not limited to striping and replication, can also be utilized by the controller 202 to form a VLUN. Additionally, the storage devices 232,234,236 may be heterogeneous; that is, they may be from different manufacturers or of different models, and may have different storage sizes, capabilities, architectures, and the like. Similarly, the hosts 204-210 may also be heterogeneous; they may be from different manufacturers or of different models, and may have different processors, operating systems, networking software, applications software, capabilities, architectures, and the like.

It can be seen from the above-described exemplary mapping arrangement that different VLUNs may contend for access to the same storage device. For example, VLUN2 216 and VLUN4 220 may contend for access to storage device 1 232; VLUN1 214 and VLUN3 218 may contend for access to storage device 2 234; and VLUN2 216 and VLUN3 218 may contend for access to storage device 3 236. A storage virtualization controller according to an embodiment of the present invention performs the mappings and resolves access contention, while allowing data transfers between the host and the storage device to occur at wire-speed.

Figure 3:
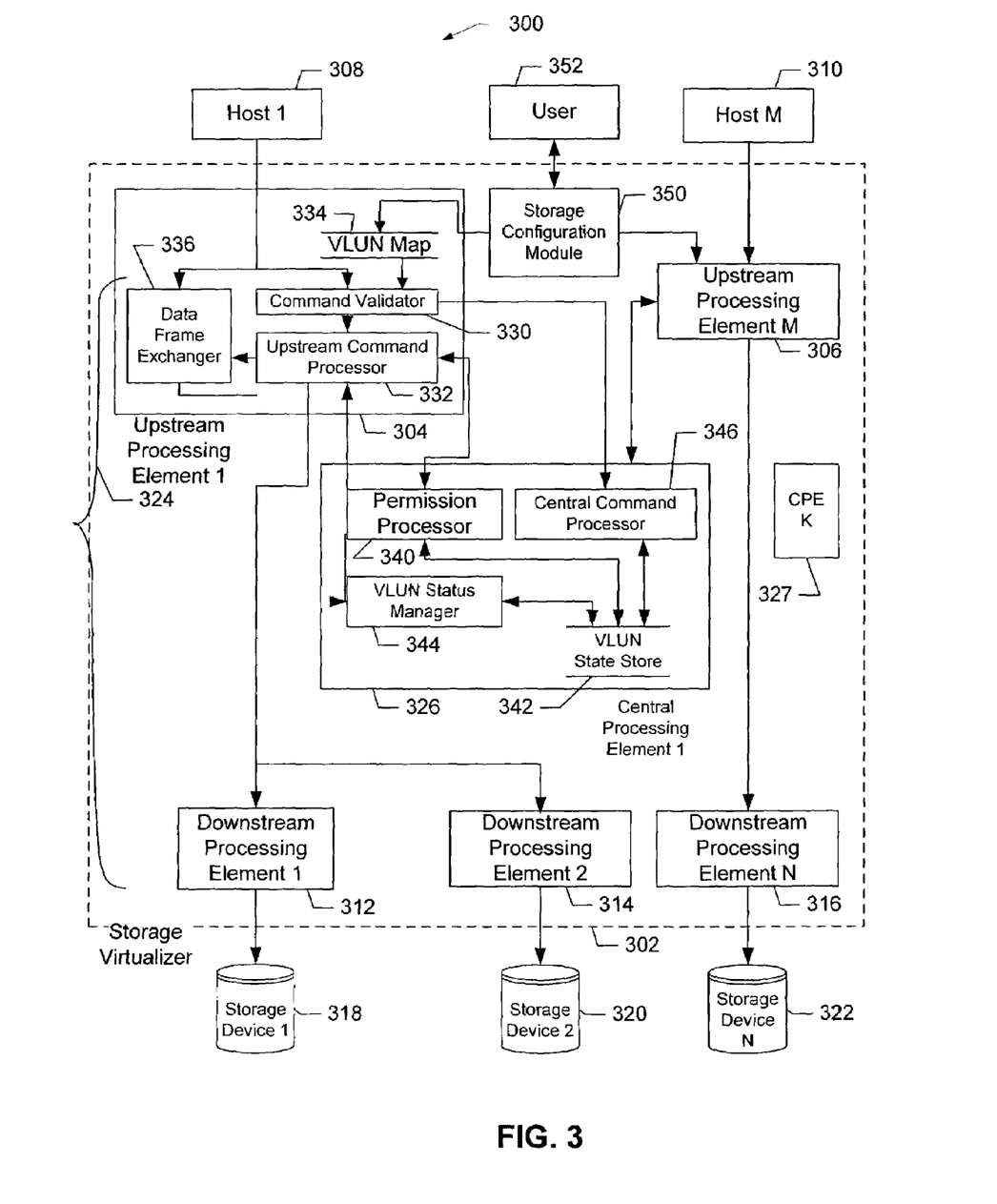
FIG. 3 is a block diagram of a storage virtualization controller according to an embodiment of the present invention and usable in the storage networks of FIGS. 1 and 2.

Considering now the storage virtualization controller 302 in greater detail, and with reference to the SAN 300 of FIG. 3, the controller 302 includes at least one upstream processing element (two UPEs 304,306 are shown for clarity)

adapted for connection to a corresponding one of the hosts 308,310 for transferring data between the corresponding host and its VLUN. The controller 302 also includes at least one downstream processing element (three DPEs 312,314, 316 are shown for clarity) each adapted for connection to a corresponding one of the storage devices 318,320,322. Each storage device 318,320,322 is representative of at least a portion of a VLUN. A selected one of the UPEs (in this example, UPE 304) is configurably and intermittently couplable for a period of time to an associated one of the DPEs (in this example, DPE 312) to form a data channel 324. The coupling is typically exclusive, such that only the coupled host can access the coupled storage device during that period. The period of exclusivity typically corresponds to the time required to transfer of a slice of data between the corresponding host and the corresponding storage device. The channel 324 is operable at a wire-speed data transfer rate to transfer blocks of data between host 308 connected to the channel 324 and storage device 318 connected to the channel 324.

The term "wire-speed" means that the data transfers occur at a rate that matches the data rate of the link to which the storage virtualization controller 302 is connected and does not result in adverse degradation of the link. The ability of the controller 302 to perform wire-speed transfers is of particular importance when the controller 302 is used in a high-speed network such as, but not limited to, a fibre channel-based version of SAN 100 previously discussed with reference to FIG. 1. Fibre channel networks typically operate at a data rate of at least one gigabit per second, with some versions that are available at the present time operating at a two gigabit per second data rate. In a symmetric, in-band configuration where a substantial amount of SAN traffic flows through the controller 302, even a small delay caused by the controller 302 on each data transaction will accumulate to form a substantial aggregate delay and resulting slowdown of the network. The controller 302 of the present invention performs such wire-speed transfers and avoids degradation of network operation. The details of how this wire-speed transmission is accomplished in the storage virtualization controller 302 will be discussed subsequently with regard to the interactions between a UPE, a DPE, and a central processing element (CPE), such as CPE 326. CPE 326 regulates the establishment of the channel by performing contention resolution and granting the exclusive permission to the UPE to transfer data with the DPE, but does not otherwise participate in the data transfers between the UPE and the DPE. An individual CPE may manage one or more VLUNs. For instance, in the example SAN 300 of FIG. 3, CPE 326 manages the VLUNs associated with host 1 308 (which is linked to CPE 326 via UPE 1 304) and host M 310 (linked to CPE 326 via UPE M 306). Controller 302 may include more than one CPE, such as CPE 327; each CPE may manage a different set of VLUNs via connections to additional UPEs and hosts (not shown). However, for clarity, the discussion of the present invention will only involve the operation of a single CPE 326.

Before considering the various elements of the storage virtualization controller 302 in further detail, it is useful to discuss the format and protocol of the storage requests that are sent over SAN 300 from a host to a storage device through the controller 302. Many storage devices frequently utilize the Small Computer System Interface (SCSI) protocol to read and write the bytes, blocks, frames, and other organizational data structures used for storing and retrieving information. Hosts access a VLUN using these storage devices via some embodiment of SCSI commands; for example, layer 4 of Fibre Channel protocol. However, it should be noted that the present invention is not limited to storage devices or network commands that use SCSI protocol.

Storage requests may include command frames, data frames, and status frames. The controller 302 processes command frames only from hosts, although it may send command frames to storage devices as part of processing the command from the host. A storage device never sends command frames to the controller 302, but only sends data and status frames. A data frame can come from either host (in case of a write operation) or the storage device (in case of a read operation).

In many cases one or more command frames is followed by a large number of data frames. Command frames for read and write operations include an identifier that indicates the VLUN that data will be read from or written to. A command frame containing a request, for example, to read or write a 50 kB block of data from or to a particular VLUN may then be followed by 25 continuously-received data frames each containing 2 kB of the data. Since data frames start coming into the controller 302 only after the controller has processed the command frame and sent a go-ahead indicator to the host or storage device that is the originator of the data frames, there is no danger of data loss or exponential delay growth if the processing of a command frame is not done at wire-speed; the host or the storage device will not send more frames until the go-ahead is received. However, data frames flow into the controller 302 continuously once the controller gives the go-ahead. If a data frame is not processed completely before the next one comes in, the queuing delays will grow continuously, consuming buffers and other resources. In the worst case, the system could run out of resources if heavy traffic persists for some time.

Considering now in further detail the downstream processing elements, each DPE 312,314,316 can be connected to a corresponding storage device 318,320,322. The connection is typically made between a port (not shown) on the controller 302 that is connected to the DPE 312,314,316 and a corresponding port (not shown) on the storage device 318,320,322. Each DPE 312,314,316 functions as an initiator to its connected storage device 318,320,322, and transfers commands, data, and status to and from the storage device 318,320,322 typically according to SCSI protocol.

Considering now in further detail the upstream processing elements, each UPE 304,306 can be connected to a corresponding host 308,310. The connection is typically made between a port (not shown) on the controller 302 that is connected to the UPE 304,306 and a corresponding port (not shown) on the host 308,310. Each UPE appears as a VLUN to its connected host 308,310, and transfers commands, data, and status to and from the host 308,310 typically according to an embodiment of SCSI commands such as layer 4 of Fibre Channel protocol.

Commands sent from a host (for example, host 308) to a UPE (for example, UPE 304) are received by a command validator 330. The command validator 330 validates the command frames to form validated commands, and routes the validated commands for execution. One class of commands is routed to the CPE 326 as will be discussed subsequently, while another class of commands is routed to an upstream command processor 332. Validation includes verifying that the host has access rights to a particular VLUN; for example, a particular host may have only read access to the VLUN, and write commands would result in an error condition.

The UPE 304 also includes a virtual logical unit map 334 that identifies the storage device and the DPE associated with the VLUN. The command validator 330 uses the map 334 to identify the DPE (for example, DPE 314) that is associated with the storage device (for example, storage device 320) corresponding to the VLUN. The upstream command processor 332 can then be coupled to the identified DPE. The map 334 is typically a data structure (for example, a tree or table) that contains data that describes which slices of LUNs on which storage devices comprise the VLUN. The map 334 is preconfigured by a storage configuration module 350, as will be discussed subsequently in greater detail.

In processing a command frame for a read, write, or status command, the upstream command processor 332 seeks permission from the CPE 326 to gain exclusive access to the storage device. Once permission is received, the UPE 304 may engage in wire-speed communications with the selected DPE 314 corresponding to the data block. The upstream command processor 332 configures a data frame exchanger 336 to communicate with the selected DPE 314 such that subsequently-received data frames associated with the command frame get transferred between the UPE 304 and the DPE 314 at wire-speed. The upstream command processor 332 may inform the CPE 326 of the status of the execution of commands. All the interactions between the UPE 304 and the CPE 326 will be discussed subsequently in greater detail.

Considering now in further detail the central processing element 326, the CPE 326 is coupled to at least one UPE (FIG. 3 illustrates two UPEs 304,306 as coupled to CPE 326). CPE 326 manages access to the VLUNs of the hosts 308,310 connected to UPEs 304,306. The coupling of UPEs to CPE 326 is preconfigured by storage configuration module 350, as will be discussed subsequently in greater detail.

To arbitrate access by a host to a storage device, the CPE 326 utilizes a permission processor 340. The permission processor 340 receives requests for a period of exclusive access to the storage device from the UPEs 304,306 that the CPE 326 manages. In processing such a request, the permission processor 340 accesses a virtual logical unit state store 342 that maintains a current state of each VLUN that the CPE 326 manages. Based at least in part on the current state of the relevant VLUN, the permission processor 340 may grant permission, deny permission, or defer permission. If permission is granted, the UPE may proceed with wire-speed data transfer, as has been explained above. Thus the CPE 326 performs contention resolution for the controller 302.

Permission is typically granted if the storage device is on-line and no other UPE currently has exclusive access to the storage device. Permission is typically denied if the storage device is off-line, is being formatted, or has been reserved for an unknown time period. Permission is typically deferred for later execution if another UPE currently has exclusive access to the storage device. If permission is deferred, the CPE maintains and manages a queue of access requests, and will inform the proper UPE when its request is granted.

The CPE 326 also includes a virtual logical unit status manager 344 that receives status information for commands executed by the upstream command processor 332. The VLUN status manager 344 updates the current state of the VLUN in the VLUN state store 342 based on the received status information.

As mentioned previously, the UPE passes a second class of commands to the CPE 326 for processing. This processing is performed by a central command processor 346. Some of the commands in this second class include SCSI commands that directly affect or are affected by the VLUN state, such as Reserve, Release, Test Unit Ready, Start Unit, Stop Unit, Request Sense, and the like. Others of the commands in the second class include task management commands that affect the permission granting process or a pending queue, such as Abort Task Set, Clear Task Set, LU Reset, Target Reset, and the like. If any of the second class of commands results in a change of VLUN state, the central command processor 346 updates the current state of the VLUN in the VLUN state store 342 accordingly.

As referred to previously, the storage virtualization controller 302 also typically includes a storage configuration module 350. A user 352 may interact with the controller (either directly through a user interface provided by the storage configuration module 350, or through an intermediary system) to define the mapping of VLUNs to LUNs on storage devices 318,320,322, and further to DPEs 312,314, 316. The configuration may be in accordance with user-defined profiles, and can implement desired storage topologies such as mirroring, striping, replication, clustering, and the like. The resulting configuration for each VLUN of a host 308,310 is stored in the VLUN map 334 of the UPE 304,306 connected to the host.

It should be noted that the various processing elements (CPE, DPE, UPE) of the storage virtualization controller 302 can be implemented using a variety of technologies. In some implementations, each element may include a separate processor, with processing logic implemented either in firmware, software, or hardware. In other implementations, multiple elements may be implemented as separate processes performed by a single processor through techniques such as multitasking. In still other implementations, one or more custom ASICs may implement the elements.

Figure 4:
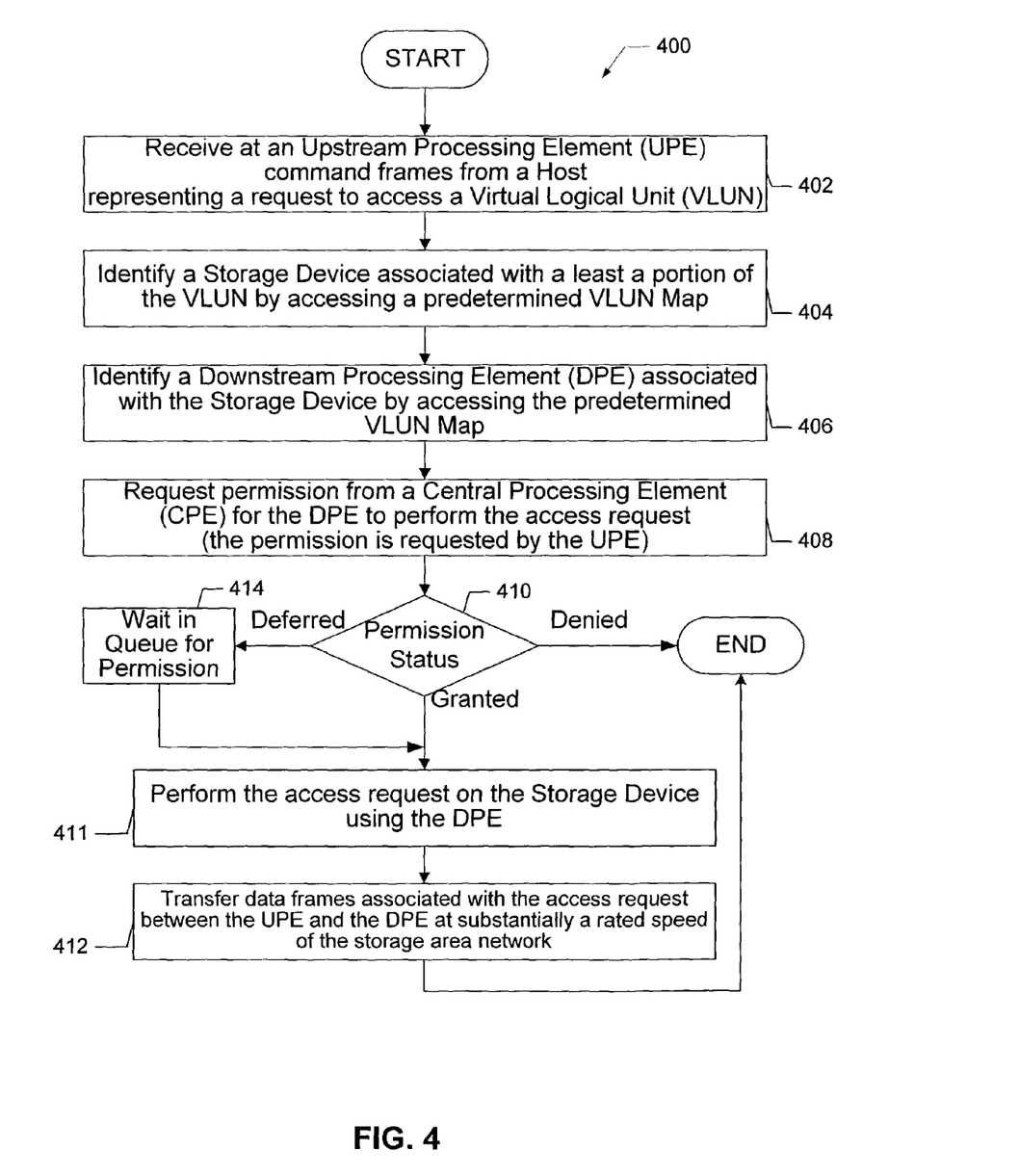
FIG. 4 is a flowchart of a method for accessing a virtual logical unit in a storage area network according to an embodiment of the present invention.

Another embodiment of the present invention, as best understood with reference to FIG. 4, is a method 400 for accessing a virtual logical unit in a storage area network that may be implemented by the processors of the storage virtualization controller 302. Alternatively, the method 400 may be considered as a flowchart of at least a portion of the operation of the storage virtualization controller 302. At 402, an upstream processing element receives an access request for the virtual logical unit. The access request is received from a host connected to the upstream processing element, and includes a command frame. At 404, a storage device associated with at least a portion of the virtual logical unit is identified by accessing a predetermined virtual logical unit map. At 406 a downstream processing element associated with the storage device is identified by accessing a predetermined virtual logical unit map. At 408, permission for the downstream processing element to perform the access request is requested from a central processing element by the upstream processing element. If permission is denied ("Denied" branch of 410), the method 400 concludes without transferring the data. If permission is obtained ("Granted" branch of 410), then, at 411, the downstream processing element performs the access request on the storage device, typically by executing at least one command in the command frame on the storage device. Commands, as will be discussed subsequently, may include read data and write data commands. Then, at 412, data associated with the access request, such as the data to be read or written, is transferred between the upstream processing element and the downstream processing element at substantially a rated speed of the storage area network after the permission is obtained, and the method 400 concludes. If permission is deferred ("Deferred" branch of 410), then, at 414, the access request is placed in a queue to wait for permission to be granted; when permission is received, the method continues at 411 as previously described.

Figure 5:
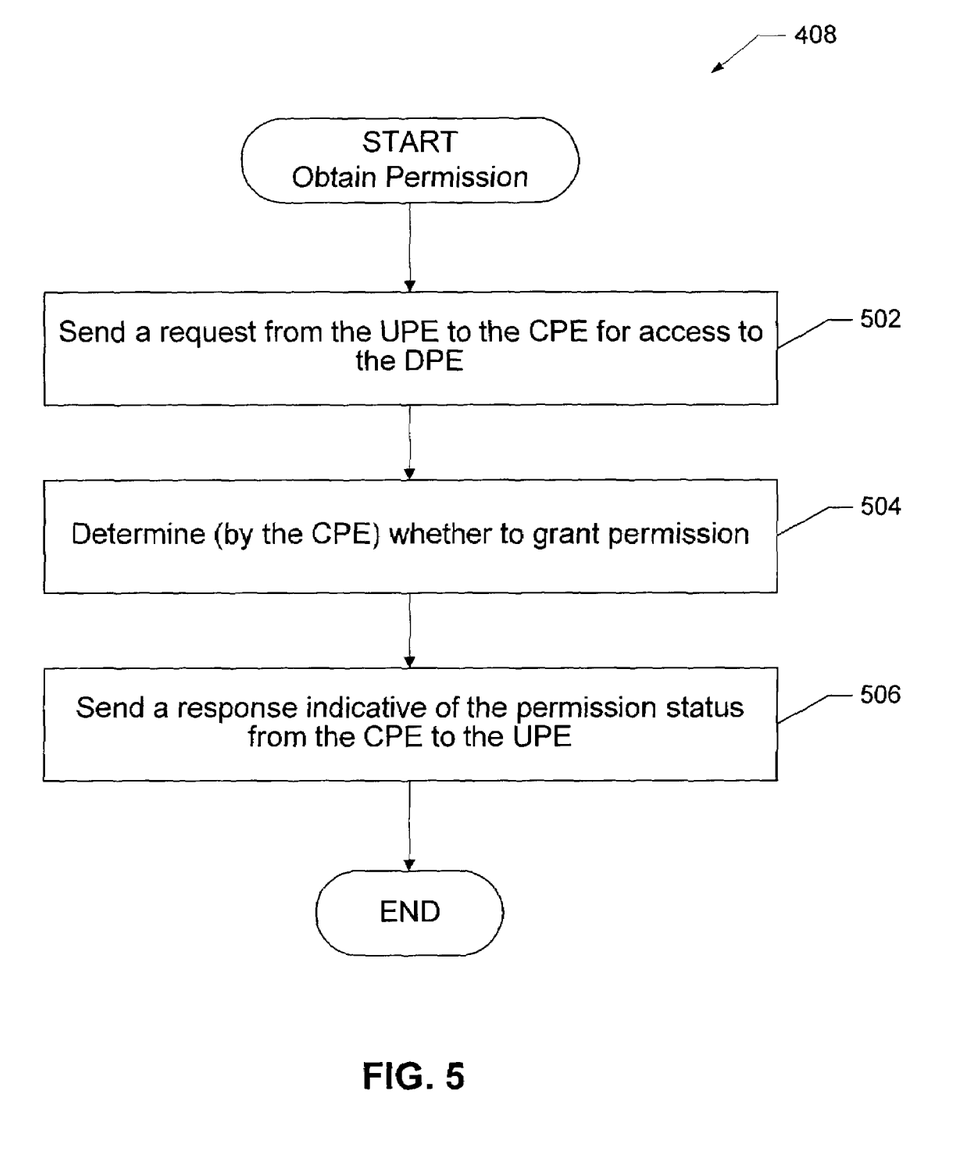
FIG. 5 is a lower-level flowchart according to an embodiment of the present invention of a portion of the method of FIG. 4 for obtaining access permission.

Considering now in further detail the step at 408 of obtaining permission, and with reference to FIG. 5, at 502 a permission request for access to the downstream processing element is sent from the upstream processing element to the central processing element. At 504, the central processing element determines whether to grant permission. At 506, a permission response is sent from the central processing element to the upstream processing element, and the obtaining permission step 408 concludes.

Figure 6:
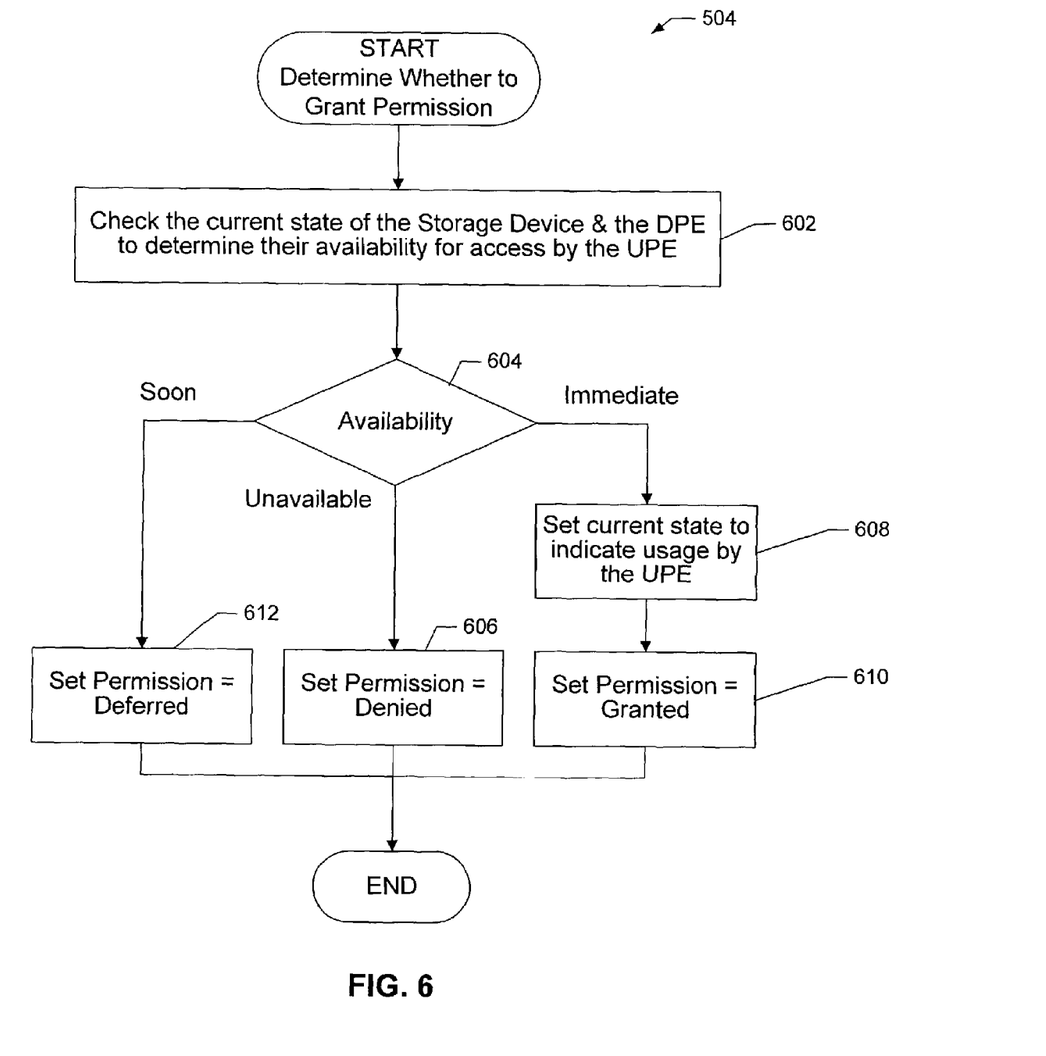
FIG. 6 is a lower-level flowchart according to an embodiment of the present invention of a portion of the method of FIG. 5 for determining whether to grant access permission.

Considering now in further detail the step at 504 of determining whether to grant permission, and with reference to FIG. 6, at 602 a current state of the storage device, the downstream processing element, or both is checked in order to determine whether the storage device and the downstream processing element are available for access by the upstream processing element. If the checked device or element is not available ("Unavailable" branch of 604), then at 606 the permission is set to "Denied", and the step 504 concludes. If the resource is not presently available due to its usage by another UPE, but will become available when that UPE (and perhaps other UPEs with higher priority in a queue) finishes with the usage ("Soon" branch of 604), then at 612 the permission is set to "Deferred", and the step 504 concludes. If the resource is available ("Immediate" branch of 604), then at 608 the current state of the resource is set to indicate its usage by the UPE. At 610, the permission is set to "Denied", and the step 504 concludes.

Figure 7:
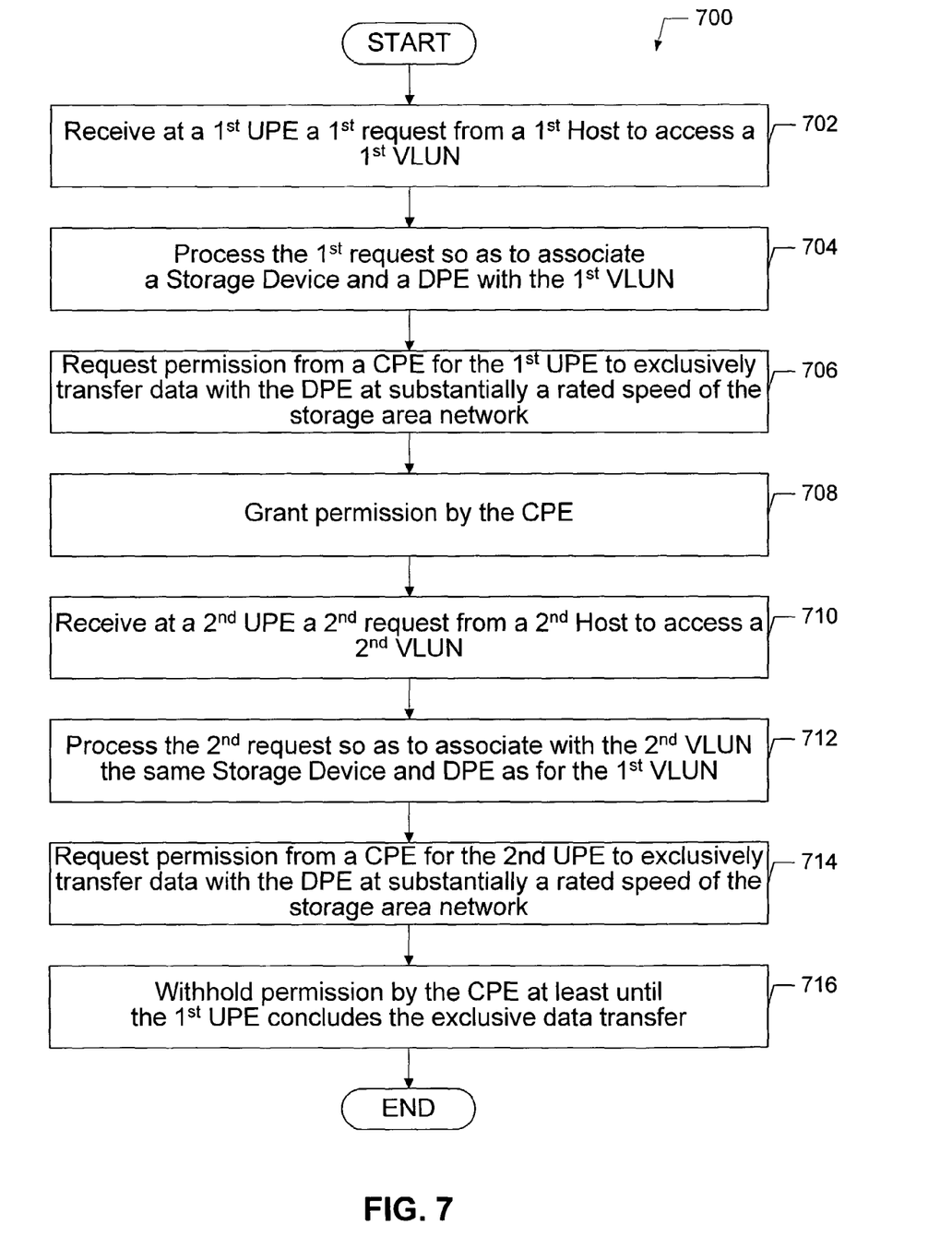
FIG. 7 is a flowchart of a method for different hosts to access a virtual logical unit in a storage area network according to another embodiment of the present invention.

A further embodiment of the present invention, as best understood with reference to FIG. 7, is a method 700 for accessing a virtual logical unit in a storage area network that may be implemented by the processors of the storage virtualization controller 302. Alternatively, the method 700 may be considered as a flowchart of the operation of the storage virtualization controller 302. The method begins at 702 by receiving at a first upstream processing element a first request from a first host to access a first virtual logical unit. At 704, the first request is processed so as to associate a storage device and a downstream processing element with the first virtual logical unit. At 706, permission for the first upstream processing element to exclusively transfer data with the downstream processing element at substantially a rated speed of the storage area network is requested from the central processing element. At 708, permission is granted by the central processing element. At 710, a second request from a second host to access a second virtual logical unit is received at a second upstream processing element. At 712, the second request is processed so as to associate the storage device and the downstream processing element with the second virtual logical unit, setting up a resource contention situation where both the first UPE and the second UPE both require access to the same DPE. At 714, permission for the second upstream processing element to exclusively transfer data with the downstream processing element at substantially the rated speed of the storage area network is requested from the central processing element. At 716, the central processing element withholds permission at least until such time as the first upstream processing element concludes the exclusive data transfer, thus resolving the contention situation.

Figure 8:
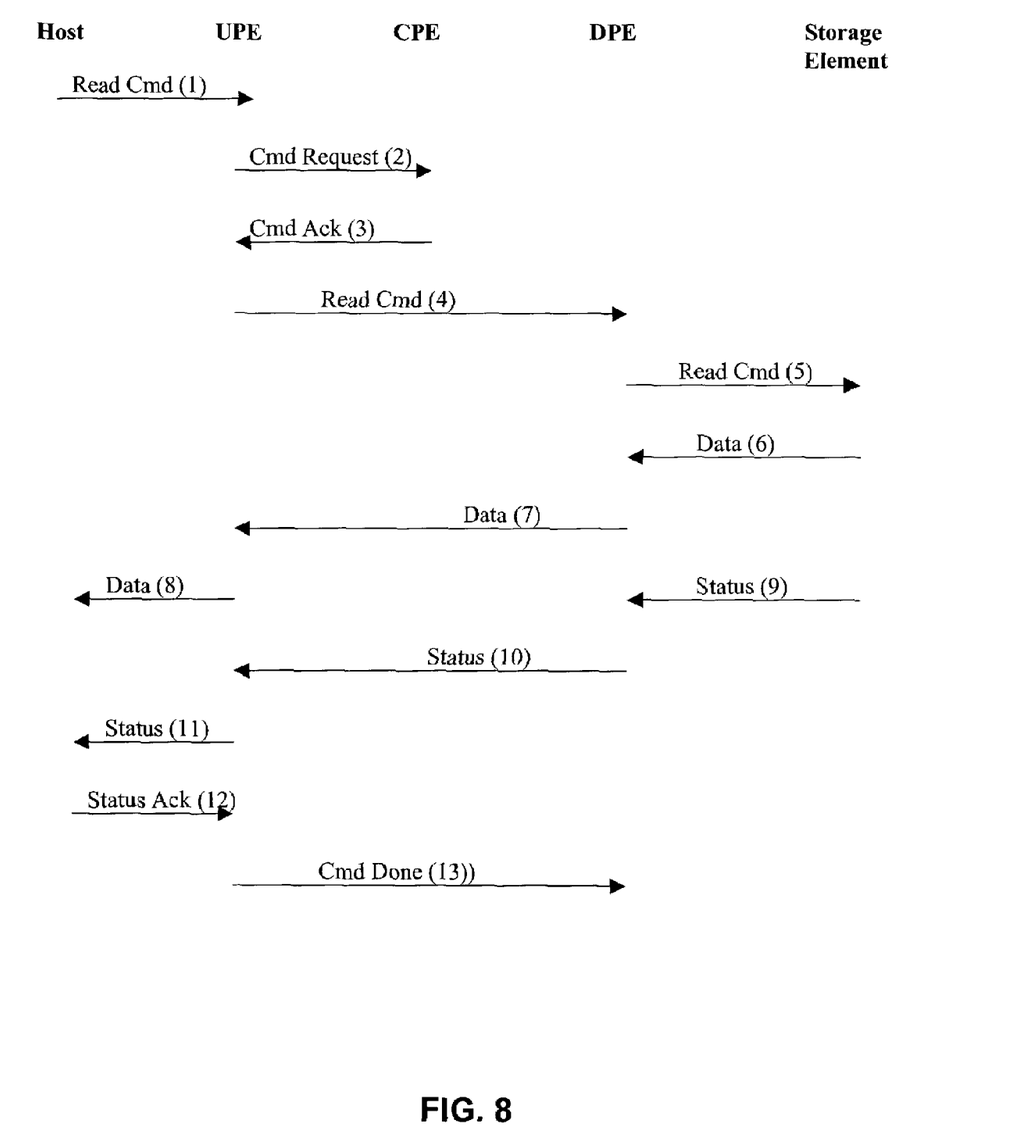
FIG. 8 is a flow diagram illustrative of the flow of commands and data between the host, the storage virtualization controller, and the storage device of a storage area network according to an embodiment of the present invention for reading data from the storage device.

Considering now in further detail the processing of a read command by the storage virtualization controller, and with reference to the flow diagram of FIG. 8 where "( )" indicates the order of processing, a Read Command (1) is sent from the host to the UPE. The UPE sends a Command Request (2) to the CPE. When access permission is granted, the CPE sends a Command Acknowledgment (3) to the UPE. The UPE then sends the Read Command (4) to the DPE, which passes the Read Command (5) to the storage device. When the storage device is ready, it returns Data (6) to the DPE, which passes the Data (7) to the UPE, which in turn passes the Data (8) to the host. The transfer of data from the storage device to the DPE to the UPE to the host occurs at wire speed according to the present invention. The storage device also returns Status (9) to the DPE, which passes the Status (10) to the UPE, which in turn passes the Status (11) to the host. The host then sends Status Acknowledgment (12) to the UPE, and the UPE sends Command Done (13) to the DPE.

Figure 9:
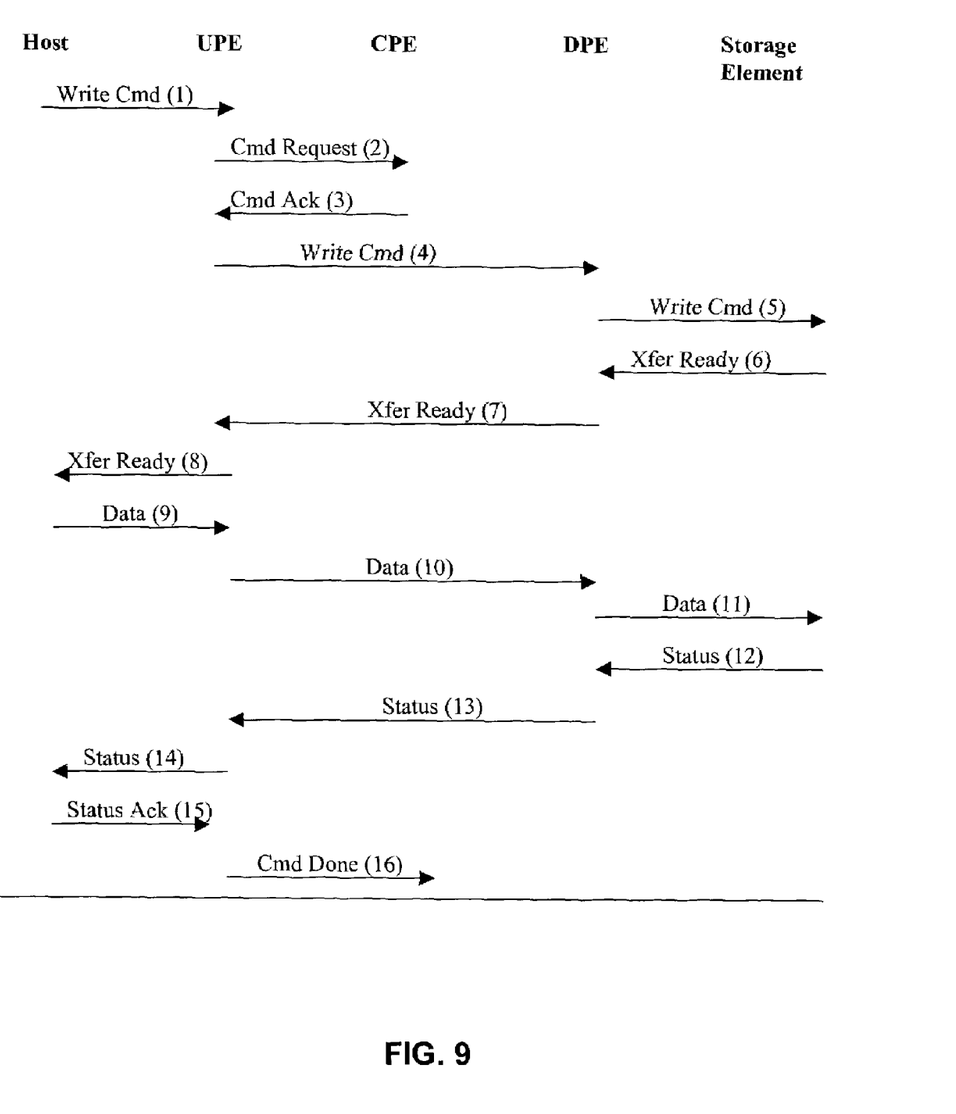
FIG. 9 is a flow diagram illustrative of the flow of commands and data between the host, the storage virtualization controller, and the storage device of a storage area network according to an embodiment of the present invention for writing data to the storage device.

Considering now in further detail the processing of a write command by the storage virtualization controller, and with reference to FIG. 9 where "( )" indicates the order of processing, a Write Command (1) is sent from the host to the UPE. The UPE sends a Command Request (2) to the CPE. When access permission is granted, the CPE sends a Command Acknowledgment (3) to the UPE. The UPE then sends the Write Command (4) to the DPE, which passes the Write Command (5) to the storage device. When the storage device is ready to accept data, it sends Xfer Ready (6) to the DPE, which passes Xfer Ready (7) to the UPE, which in turn passes Xfer Ready (8) to the host. The host then sends Data (9) to the UPE, which passes the Data (10) to the DPE, which in turn passes Data (11) to the storage device. The transfer of data from the host to the UPE to the DPE to the storage device occurs at wire speed according to the present invention. The storage device provides Status (12) indicative of the transfer to the DPE, which passes Status (13) to the UPE, which in turn passes Status (14) to the host. The host then sends Status Acknowledgment (15) to the UPE, and the UPE sends Command Done (16) to the DPE.

Figure 10:
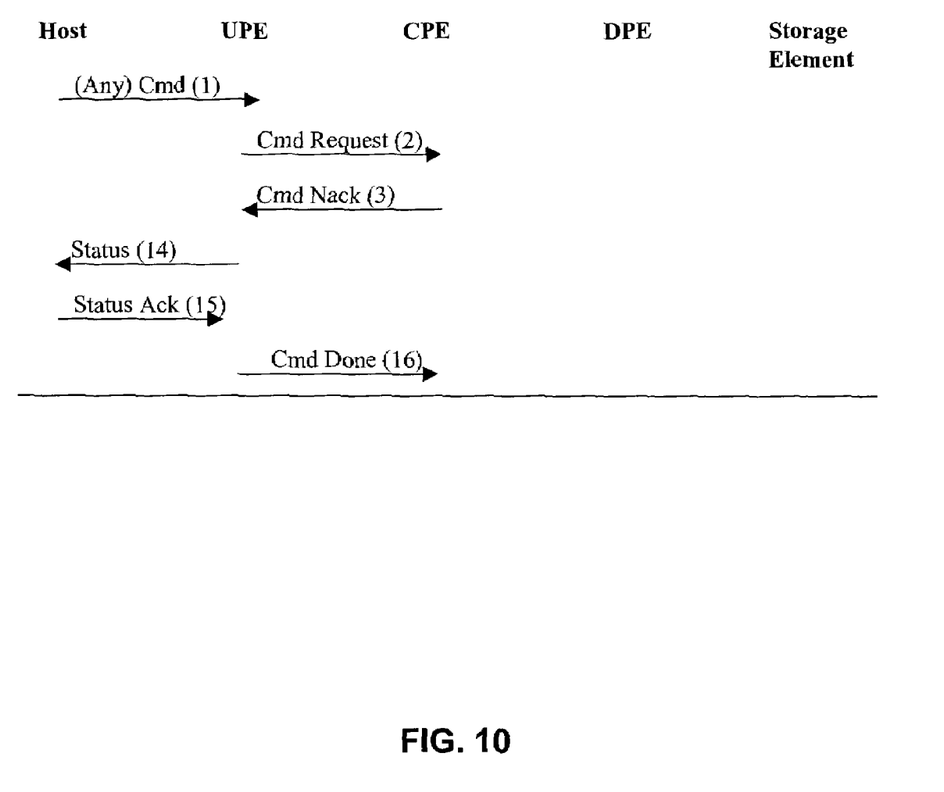
FIG. 10 is a flow diagram illustrative of the flow of commands and data between the host, the storage virtualization controller, and the storage device of a storage area network according to an embodiment of the present invention for withholding permission to access the storage device.

Considering now in further detail the rejection of a command by the storage virtualization controller, and with reference to FIG. 10 where "( )" indicates the order of processing, a Command (1) is sent from the host to the UPE. The UPE sends a Command Request (2) to the CPE. When access permission is denied, the CPE sends a Command Not Acknowledged response (3) to the UPE. The UPE then sends Status (4) indicative of the command rejection to the host. The host then sends Status Acknowledgment (5) to the UPE, and the UPE sends Command Done (6) to the DPE.

From the foregoing it will be appreciated that the storage virtualization controller, system, and methods provided by the present invention represent a significant advance in the art. Although several specific embodiments of the invention have been described and illustrated, the invention is not limited to the specific methods, forms, or arrangements of parts so described and illustrated. For example, the invention is not limited to storage systems that use SCSI storage devices, nor to networks utilizing fibre channel protocol. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. The invention is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A storage virtualization controller, comprising:
   a downstream processing element adapted to connect and access a storage device in response to an access request;
   an upstream processing element adapted to connect to a host that receives the access request for the storage device and configurably coupleable to the downstream processing element to facilitate the transfer of data between the host and the storage device; and
   a central processing element coupled to the upstream processing element that receives a permission request responsive to the access request at the upstream processing element and determines permission for the downstream element to access the storage device and the upstream processing element to transfer the data without further involvement by the central processing element.

2. The system of claim 1, wherein the host and the storage device are directly connected to the storage virtualization controller.

3. The system of claim 1, wherein the data is transferred between the downstream processing element and the storage device according to a SCSI protocol.

4. The system of claim 1, wherein at least one of the host and the storage device is connected to the storage virtualization controller through a switching network.

5. The system of claim 4, wherein a wire-speed data transfer rate is the data transfer rate.

6. The system of claim 5, wherein the switching network is a fibre-channel fabric, and the data transfer rate is at least 1 gigabits per second.

7. The system of claim 5, wherein the switching network is a fibre-channel fabric, and the data transfer rate is at least 2 gigabits per second.

8. The system of claim 1, wherein the upstream processing element includes:
   a command validator that receives command frames from the host, validates the command frames to form validated commands, and routes the validated commands for execution; and
   an upstream command processor coupled to the command validator that executes a first class of the validated commands.

9. The system of claim 8, wherein the central processing element includes:
   a central command processor coupled to the command validator that executes a second class of the validated commands.

10. The system of claim 8, wherein the command frames include an identifier for a virtual logical unit, the upstream processing element further comprising:
    a virtual logical unit map coupled to the command validator that identifies the downstream processing element associated with the virtual logical unit, the downstream processor coupled to the upstream command processor.

11. The system of claim 10, wherein the central processing element is associated with the virtual logical unit, the central processing element further comprising:
    a virtual logical unit state store that maintains a current state of the virtual logical unit; and
    a permission processor coupled to the upstream command processor that receives a request for permission to transfer data frames between the upstream processing element and the downstream processing element, the permission processor further coupled to the virtual logical unit state store for determining from the current state whether to grant the permission.

12. The system of claim 11, wherein the central processing element includes:
    a virtual logical unit status manager coupled to the upstream command processor for receiving status information about an execution status of the validated commands, and coupled to the virtual logical unit state store for updating the current state of the virtual logical unit based on the status information.

13. The system of claim 10, wherein the upstream processing element includes:
    a data frame exchanger that receives data frames from one of the host and the storage device and transfers the data frames to the other of the host and the storage device at a wire-speed transfer rate.

14. The system of claim 13, wherein the data frame exchanger is coupled to the upstream command processor and configurably coupleable to the downstream processing element, the data frame exchanger instructed by the upstream command processor to couple to the downstream processing element.

15. The system of claim 1, wherein the upstream processing element appears as a virtual logical unit to the host, and wherein the downstream processing element appears as an initiator to the storage device.

16. A storage virtualization system, comprising:
    at least one upstream processing element adapted for connection to a host that receives an access request for transferring data between the host and a virtual logical unit;
    at least one downstream processing element adapted to connect and access a storage device representing at least a portion of the virtual logical unit in response to the access request, a selected one of the downstream processing elements intermittently coupleable to an associated one of the upstream processing elements to form a channel operable at a predetermined data transfer rate; and
    a central processing element coupled to the associated one of the upstream processing elements that receives a permission request responsive to the access request at the upstream processing element and determines permission for the downstream processing element to access the portion of the virtual logical unit via the channel.

17. The system of claim 16, wherein the host and the storage device are each connected to the storage virtualization system via a point-to-point connection.

18. The system of claim 17, wherein at least one of the host and the storage device is connected to the storage virtualization system via a switching network.

19. The system of claim 18, wherein a wire-speed data transfer rate is the predetermined data transfer rate of the switching network.

20. The system of claim 19, wherein the switching network is a fibre-channel fabric, and the predetermined data transfer rate of the switching network is at least 1 gigabits per second.

21. The system of claim 19, wherein the switching network is a fibre-channel fabric, and the predetermined data transfer rate of the switching network is at least 2 gigabits per second.

22. The system of claim 16, wherein the permission is an exclusive permission during the intermittent coupling of the selected one of the downstream processing elements to the associated one of the upstream processing elements.

23. The system of claim 16, wherein each upstream processing element is adapted for connection to a different host, and wherein each downstream processing element is adapted for connection to a different storage device.

24. The system of claim 23, wherein at least some of the different hosts are heterogeneous.

25. The system of claim 23, wherein at least some of the different storage devices are heterogeneous.

26. The system of claim 23, wherein the associated one of the upstream processing elements further includes a virtual logical unit map, the system further comprising:
a storage configuration module that defines a mapping between the virtual logical unit, one of the storage devices, and one of the downstream processing elements, the mapping stored in the virtual logical unit map and accessible by the associated one of the upstream processing elements.

27. A storage virtualization controller, comprising:
a data transfer path to transfer information between a selected host and a selected storage device at a predetermined speed of a storage area network, the data transfer path configurable between one of a plurality of upstream processing elements connectable to a corresponding one of a plurality of hosts receiving an access request for the selected storage device, and one of a plurality of downstream processing elements connectable to a corresponding one of a plurality of storage devices in response to the access request; and
a permission processor coupled to the one upstream processing element that receives a permission request responsive to the access request at the upstream processing element and determines permission for the downstream element to provide one of the plurality of hosts a period of exclusive access to the data transfer path.

28. The system of claim 27, wherein the data link is a fibre channel fabric, and the predetermined rated speed is at least 1 gigabit per second.

29. The system of claim 27, wherein the period of exclusive access corresponds to the transfer of a slice of data between the corresponding host and the corresponding storage device.

30. A method of accessing a virtual logical unit in a storage area network, comprising:
receiving at an upstream processing element an access request for the virtual logical unit;
identifying a storage device associated with at least a portion of the virtual logical unit;
identifying a downstream processing element associated with the storage device;
sending a permission request, responsive to the access request, to a central processing element to permit the downstream processing element to perform the access request on the storage device, the permission determined at the central processing element and sent to the upstream processing element; and
transferring data associated with the access request between the upstream processing element and the downstream processing element at a predetermined speed of the storage area network after the permission is obtained.

31. The method of claim 30, wherein the predetermined speed is at least one gigabit per second.

32. The method of claim 30, wherein receiving the access request includes receiving the access request from a host connected to the upstream processing element, the access request including a command.

33. The method of claim 30, further comprising:
the downstream processing element executing the command on the storage device.

34. The method of claim 30, wherein the identifying a storage device further comprises:
accessing a predetermined virtual logical unit map to determine the storage device associated with at least the portion of the virtual logical unit.

35. The method of claim 30, wherein the identifying a downstream processing element further comprises:
accessing a predetermined virtual logical unit map to determine the downstream processing element associated with the storage device.

36. The method of claim 30, wherein the permission determined at the central processing element includes:
checking a current state of at least one of the storage device and the downstream processing element in order to determine whether the storage device and the downstream processing element are available for access by the upstream processing element; and
if available for access, setting a new state of the at least one of the storage device and the downstream processing element that is indicative of use by the upstream processing element.

37. The method of claim 30, wherein the permission response grants the permission.

38. The method of claim 30, wherein the permission response denies the permission.

39. The method of claim 30, wherein the permission response defers the permission, the method further including:
waiting in a queue for the permission to be granted.

40. A storage virtualization system, comprising:
means for receiving at an upstream processing element an access request from a host for a virtual logical unit in a storage area network;
means for identifying a storage device and a downstream processing element associated with at least a portion of the virtual logical unit;
means for sending a permission request, responsive to the access request, to a central processing element to permit the downstream processing element to perform the access request on the storage device, the permission request determined at the central processing element and sent to the upstream processing element; and
means for transferring data associated with the access request between the upstream processing element and the downstream processing element at a predetermined speed of the storage area network.

41. A method of accessing a virtual logical unit in a storage area network, comprising:
receiving at a first upstream processing element a first request from a first host to access a first virtual logical unit;
processing the first request so as to associate a storage device and a downstream processing element with at least a portion of the first virtual logical unit;
requesting permission for the first upstream processing element to transfer data with the downstream processing element at a predetermined speed of the storage area network, the central processing element wanting permission for the downstream processing element to access the storage device;

receiving at a second upstream processing element a second request from a second host to access a second virtual logical unit;

processing the second request so as to associate the storage device and the downstream processing element with at least a portion of the second virtual logical unit; and requesting permission for the second upstream processing element to transfer data with the downstream processing element at the predetermined speed of the storage area network, the central processing element withholding permission and not allowing the downstream processing element to access the storage device.

42. The method of claim 41, wherein the central processing element withholds permission at least until the first upstream processing element concludes the data transfer.

43. A storage virtualization controller, comprising:

a downstream processing element responsive to an access request adapted to connect to a storage device referenced by a predetermined virtual logical unit (VLUN) map;

an upstream processing element adapted to connect to a host that receives the access request and configurably coupleable to the downstream processing element through the predetermined virtual logical unit (VLUN) map so as to facilitate the transfer data between the host and the storage device; and a central processing element coupled to the upstream processing element that determines permission for the downstream element to access the storage device and the upstream processing element to transfer the data without further involvement by the central processing element.

44. A method of accessing a virtual logical unit in a storage area network, comprising:

receiving an access request for the virtual logical unit from an upstream processing element;

identifying a storage device associated with at least a portion of the virtual logical unit through a predetermined virtual logical unit (VLUN) map;

identifying a downstream processing element associated with the storage device by way of the predetermined virtual logical unit (VLUN) map;

obtaining an initial permission from a central processing element for the downstream processing element to perform the access request on the storage device on behalf of the upstream processing element; and obtaining the initial permission and transferring data in response to the access request directly between the upstream processing element and the downstream processing element at a predetermined speed of the storage area network without further processing by the central processing element for the transfer.

* * * * *